US010981356B2

(12) United States Patent
Ovalle et al.

(10) Patent No.: US 10,981,356 B2
(45) Date of Patent: Apr. 20, 2021

(54) ADHESIVE SHEET

(71) Applicants: LINTEC OF AMERICA, INC., Phoenix, AZ (US); LINTEC CORPORATION, Tokyo (JP)

(72) Inventors: Raquel Ovalle, Phoenix, AZ (US); Masaharu Ito, Pheonix, AZ (US); Kanzan Inoue, Phoenix, AZ (US)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 15/552,676

(22) PCT Filed: Feb. 23, 2016

(86) PCT No.: PCT/JP2016/055127
§ 371 (c)(1),
(2) Date: Aug. 22, 2017

(87) PCT Pub. No.: WO2016/136685
PCT Pub. Date: Sep. 1, 2016

(65) Prior Publication Data
US 2018/0043659 A1  Feb. 15, 2018

Related U.S. Application Data

(60) Provisional application No. 62/119,478, filed on Feb. 23, 2015, provisional application No. 62/252,908, filed on Nov. 9, 2015, provisional application No. 62/258,352, filed on Nov. 20, 2015.

(51) Int. Cl.
B32B 27/14 (2006.01)
B32B 9/00 (2006.01)
B32B 27/12 (2006.01)

(52) U.S. Cl.
CPC .............. *B32B 9/007* (2013.01); *B32B 27/12* (2013.01); *B32B 27/14* (2013.01); *B32B 2255/02* (2013.01); *B32B 2255/26* (2013.01); *B32B 2262/106* (2013.01); *B32B 2264/108* (2013.01); *B32B 2305/77* (2013.01); *B32B 2405/00* (2013.01)

(58) Field of Classification Search
CPC ......... B32B 9/007; B32B 27/14; B32B 27/12; B32B 27/2262; B32B 27/106; B32B 2255/02; B32B 2255/26
USPC ....................................................... 428/299.1
See application file for complete search history.

(56) References Cited

U.S. PATENT DOCUMENTS 7,045,108 B2 * 5/2006 Jiang ........................ B01J 23/74
423/447.1
2007/0185243 A1 * 8/2007 Terada .................... C08G 59/42
523/457

2008/0029292 A1 * 2/2008 Takayama ............... G06F 3/045
174/126.4
2008/0245548 A1 * 10/2008 Fu ............................. H01R 4/04
174/117 A
2008/0248235 A1   10/2008 Feng et al.
2008/0280137 A1 * 11/2008 Ajayan ............... A61L 24/0078
428/375
2008/0308295 A1   12/2008 Fu et al.
2009/0127712 A1   5/2009 Wyland
2009/0289203 A1   11/2009 Jiang et al.
2011/0135894 A1   6/2011 Liu et al.
2011/0155713 A1   6/2011 Wang et al.
2011/0159269 A1 * 6/2011 Qian ...................... B82Y 30/00
428/299.1
2012/0107597 A1 * 5/2012 Kim ....................... B82Y 10/00
428/292.1
2012/0313499 A1   12/2012 Son et al.
2014/0093694 A1 * 4/2014 Hata ...................... C01B 32/158
428/161
2014/0322610 A1 * 10/2014 Bosnyak ............... H01M 4/131
429/231.8
2014/0331793 A1 * 11/2014 Suzuki ................... B82Y 30/00
73/862.629

FOREIGN PATENT DOCUMENTS

| CN | 101094901 A | 12/2007 |
|---|---|---|
| CN | 101239712 A | 8/2008 |
| CN | 101323759 A | 12/2008 |
| CN | 101585533 A | 11/2009 |
| CN | 101920955 A | 12/2010 |
| CN | 102086035 A | 6/2011 |
| JP | 2005-007861 A | 1/2005 |
| JP | 2006-035771 A | 2/2006 |
| JP | 2008-519122 A | 6/2008 |
| JP | 2008-523254 A | 7/2008 |
| JP | 2009-167092 A | 7/2009 |

(Continued)

OTHER PUBLICATIONS

English translation of International Preliminary Report on Patentability issued in corresponding International Patent Application No. PCT/JP2016/055127, dated Aug. 29, 2017.
International Search Report issued in Application No. PCT/JP2016/055127 dated May 24, 2016, with English translation.
Extended European Search Report issued in corresponding European Patent Application No. 16755431.0-1107 / 3263330, dated Aug. 30, 2018.
Chinese Office Action issued in corresponding Chinese Patent Application No. 201680011414.1, dated Oct. 9, 2018, with English Translation.
Office Action issued in corresponding Chinese Application No. 2016800114141.1, dated May 30, 2019, with English translation.
Japanese Office Action issued in corresponding Japanese Patent Application No. 2017-502360, dated Dec. 17, 2019, with English translation.

*Primary Examiner* — Margaret G Moore
(74) *Attorney, Agent, or Firm* — McDermott Will & Emery LLP

(57) ABSTRACT

An adhesive sheet includes: a carbon nanotube sheet including a plurality of carbon nanotubes aligned preferentially in one direction within a plane of the sheet; and an adhesive agent layer including an adhesive agent, the adhesive agent layer being curable.

11 Claims, 7 Drawing Sheets

(56) References Cited

FOREIGN PATENT DOCUMENTS

| | | | |
|---|---|---|---|
| JP | 2009-280492 | A | 12/2009 |
| JP | 2010-285344 | A | 12/2010 |
| JP | 2011-098885 | A | 5/2011 |
| JP | 2011-132387 | A | 7/2011 |
| JP | 2011-201938 | A | 10/2011 |
| JP | 2011-233633 | A | 11/2011 |
| JP | 2012-214586 | A | 11/2012 |
| JP | 5255021 | B2 | 8/2013 |
| WO | 2011/077784 | A1 | 6/2011 |

* cited by examiner

ADHESIVE SHEET

RELATED APPLICATIONS

This application is the U.S. National Phase under 35 U.S.C. § 371 of International Application No. PCT/JP2016/055127, filed on Feb. 23, 2016, which in turn claims U.S. Provisional Application No. 62/119,478, filed Feb. 23, 2015, U.S. Provisional Application No. 62/252,908, filed on Nov. 9, 2015, and U.S. Provisional Application No. 62/258,352, filed Nov. 20, 2015, the disclosures of which are incorporated by reference herein.

TECHNICAL FIELD

The present invention relates to an adhesive sheet.

BACKGROUND ART

A sheet of carbon nanotubes has been known. Such a carbon nanotube sheet possesses unique characteristics such as electrical conductivity, exothermicity and in-plane anisotropy.

For instance, Patent Literature 1 discloses a nanofiber sheet containing carbon nanotubes.

Further, for instance, Patent Literature 2 discloses a carbon nanotube structure including a protection structure, which includes at least one drawn carbon nanotube film, a base and a coating film. According to the invention of Patent Literature 2, an adhesive layer is provided to firmly fix a carbon nanotube film to a base film.

CITATION LIST

Patent Literature(s)

Patent Literature 1: JP-A-2008-523254
Patent Literature 2: Japan Patent No. 5255021

SUMMARY OF THE INVENTION

Problem(s) to be Solved by the Invention

In order to put such a carbon nanotube sheet to a practical use, the carbon nanotube sheet needs to be subjected to a secondary process to give additional characteristics allowing the carbon nanotube sheet to be easily usable in machines, devices or the like. Additionally, in order to put the carbon nanotube sheet to a practical use, for instance, the above unique characteristics of the carbon nanotube sheet should be unimpaired and, further, an article of the carbon nanotube sheet should have excellent handleability as well as excellent stability in use.

An object of the invention is to provide an adhesive sheet suitable for a practical use of a carbon nanotube sheet.

Means for Solving the Problem(s)

According to a first aspect of the invention, an adhesive sheet includes: a carbon nanotube sheet including a plurality of carbon nanotubes aligned preferentially in one direction within a plane of the sheet; and an adhesive agent layer including an adhesive agent, the adhesive agent layer being curable.

In the first aspect, it is preferable that the adhesive agent layer is curable with an energy ray.

In the first aspect, it is preferable that the carbon nanotubes of the carbon nanotube sheet are bundled into fibers with an average diameter in a range from 1 µm to 300 µm.

In the first aspect, it is preferable that the carbon nanotube sheet has been exposed to steam or particles of a room-temperature liquid substance.

In the first aspect, it is preferable that the adhesive agent layer further includes an inorganic filler.

In the first aspect, it is preferable that the inorganic filler has been surface-modified by a compound containing an energy-ray-curable functional group.

According to a second aspect of the invention, an adhesive sheet includes: a carbon nanotube sheet including a plurality of carbon nanotubes aligned preferentially in one direction within a plane of the sheet; and an adhesive agent layer including an adhesive agent, in which a light transmissivity of the adhesive sheet is 70% or more.

In the second aspect, it is preferable that the carbon nanotubes of the carbon nanotube sheet are bundled into fibers with an average diameter in a range from 1 µm to 300 µm.

In the second aspect, it is preferable that the carbon nanotube sheet has been exposed to steam or particles of a room-temperature liquid substance.

In the second aspect, it is preferable that the carbon nanotube sheet is a sheet obtained by forming the carbon nanotubes into a plurality of linear bodies each in a form of a string or a ribbon and arranging the plurality of linear bodies to form a sheet.

In the second aspect, it is preferable that the adhesive agent layer further includes an inorganic filler.

In the second aspect, it is preferable that the inorganic filler has been surface-modified by a compound containing an energy-ray-curable functional group.

The above aspect(s) of the invention provides an adhesive sheet suitable for practical use of a carbon nanotube sheet.

BRIEF DESCRIPTION OF DRAWING(S)

Figure 6:
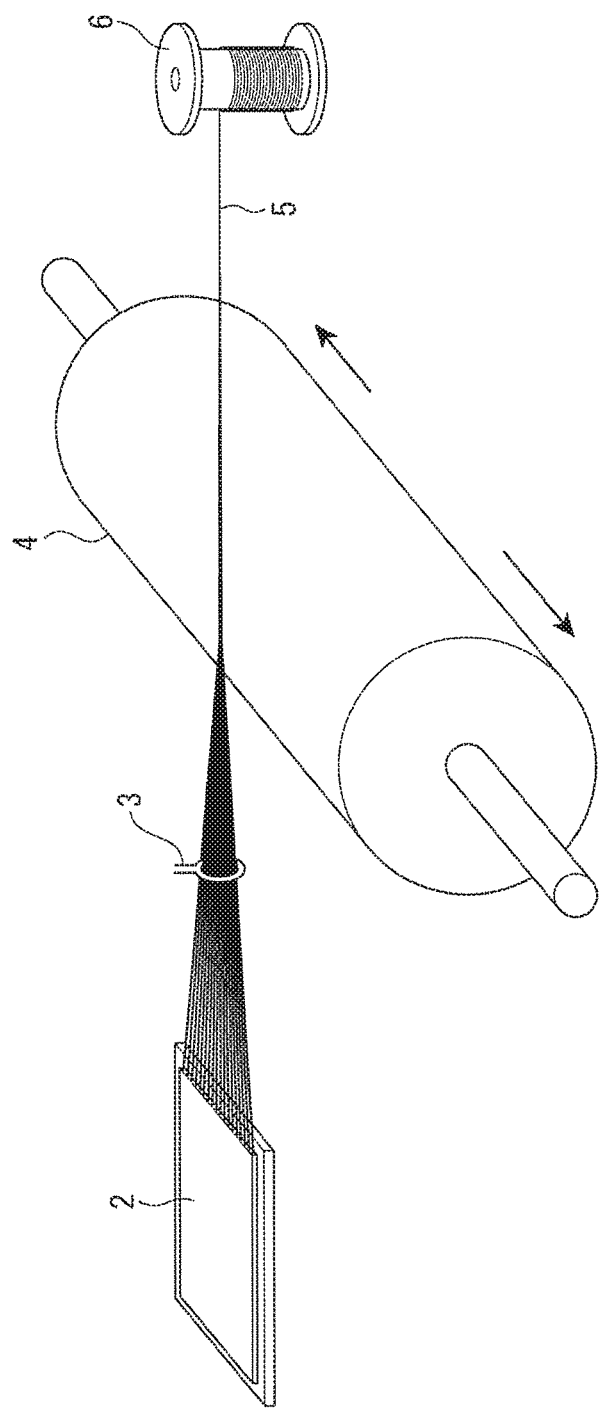

FIG. 6 schematically illustrates a process of forming a ribbon from carbon nanotubes in Examples.

Figure 7A:
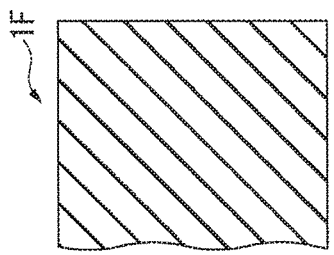

FIG. 7A schematically illustrates a process of manufacturing an adhesive sheet in Examples.

Figure 7B:
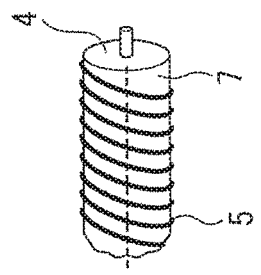

FIG. 7B schematically illustrates the process of manufacturing the adhesive sheet in Examples.

Figure 7C:
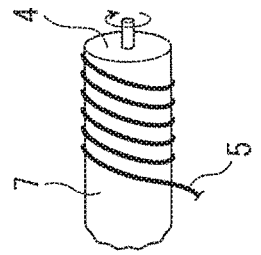

FIG. 7C schematically illustrates the process of manufacturing the adhesive sheet in Examples.

Figure 7D:
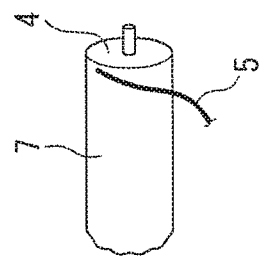

FIG. 7D schematically illustrates the process of manufacturing the adhesive sheet in Examples.

DESCRIPTION OF EMBODIMENT(S)

Adhesive Sheet

First Exemplary Embodiment

Figure 1:
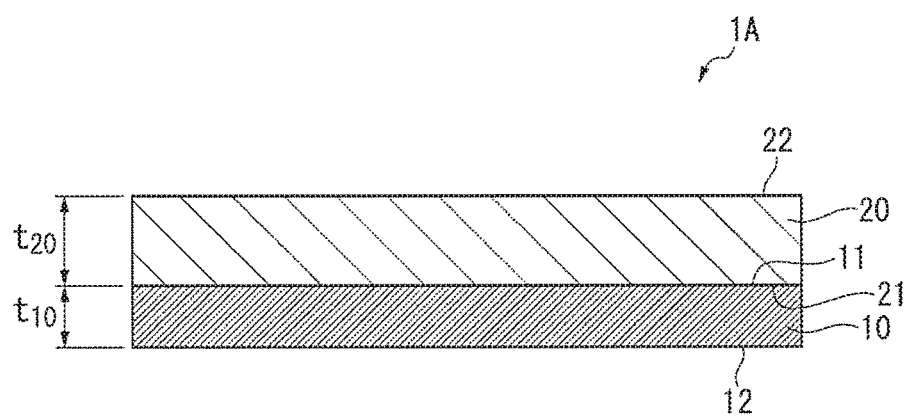
FIG. 1 is a sectional view showing an adhesive sheet according to an exemplary embodiment of the invention.

As shown in FIG. 1, an adhesive sheet 1A according to a first exemplary embodiment includes a carbon nanotube sheet 10 and an adhesive agent layer 20 containing an adhesive agent. In the adhesive sheet 1A according to the first exemplary embodiment, a first surface 11 (hereinafter, occasionally referred to as "first sheet surface 11") of the carbon nanotube sheet 10 is in contact with a first surface 21 (hereinafter, occasionally referred to as "first adhesive surface 21") of the adhesive agent layer 20.

The adhesive agent layer 20 laminated on the carbon nanotube sheet 10 prevents breakage of the carbon nanotube sheet 10. Further, the adhesive sheet can be easily stuck on an adherend.

Carbon Nanotube Sheet

The carbon nanotube sheet 10 includes a plurality of carbon nanotubes that are preferentially aligned in one direction defined in a plane of the sheet.

It should be noted that "the carbon nanotubes are aligned in a direction defined in a plane of the sheet" herein means that the carbon nanotubes are aligned along a direction defined in a plane of the sheet. For instance, the longitudinal axes of the carbon nanotubes are aligned in parallel with a direction defined in a plane of the sheet.

Further, "carbon nanotubes are preferentially aligned" herein means that the majority of the carbon nanotubes are aligned in the above manner. For instance, as long as the majority of the carbon nanotubes are aligned with the longitudinal axes thereof being in parallel with a direction defined in a plane of the sheet, a part of the carbon nanotubes may be aligned with the longitudinal axes thereof not in parallel with the direction defined in the plane of the sheet.

The carbon nanotube sheet 10 is produced by, for instance, drawing carbon nanotubes agglomerated by an intermolecular force into a sheet from a carbon nanotube forest (i.e., a grown form, which is occasionally referred to as "array", of a plurality of carbon nanotubes grown on a substrate to be vertically aligned relative to the substrate) and separating e drawn carbon nanotubes from the substrate. When drawing the carbon nanotubes into a sheet, the carbon nanotubes may be drawn from an entire width of the forest or may be drawn from a part of the width of the forest. When drawing the carbon nanotubes into a sheet, a width of the sheet may be adjusted as needed depending on the width of the forest and a drawing width of the sheet.

The carbon nanotube sheet 10 preferably has a structure where the carbon nanotubes are bundled into fibers. As long as the carbon nanotube sheet 10 has the structure where the carbon nanotubes are bundled into fibers, an area where the carbon nanotubes are present is reduced per unit area, thereby enhancing the adherability of the adhesive sheet 1A to the adherend when the adhesive sheet 1A is stuck on the adherend with the carbon nanotube sheet 10 being interposed between the adherend and the adhesive agent layer 20. When the carbon nanotube sheet 10 is manufactured, for instance, by drawing carbon nanotubes from a forest, the carbon nanotube sheet contains the carbon nanotubes evenly distributed over the carbon nanotube sheet while being aligned in one direction defined in a plane of the sheet. As described later, when such a carbon nanotube sheet is exposed to steam or the like in a free-standing (self-supported) state, the carbon nanotubes, which are evenly distributed over the carbon nanotube sheet, locally form into fine bundles to provide the structure where the carbon nanotubes are bundled into fibers. Further, as described later, a string body formed by spinning the carbon nanotube sheet 10 into a string has a structure where the carbon nanotubes are bundled into fibers, and a lot of thus-obtained string bodies are arranged so that the carbon nanotube sheet 10 has the structure where the carbon nanotubes are gathered into fibers.

An average diameter of the structure where the carbon nanotubes are bundled into fibers (an average diameter of the structures) is preferably in a range from 1 µm to 300 µm, more preferably in a range from 3 µm to 150 µm, and further preferably in a range from 5 µm to 50 µm.

It should be noted that the average diameter of the structure where the carbon nanotubes are bundled into fibers herein means an average diameter of the outer circumference(s) of the structure(s).

The carbon nanotube sheet 10 may be a sheet subjected to a densification process.

The "densification process" herein means a process for bundling the carbon nanotube sheet 10 (a plurality of adjacent ones of the carbon nanotubes of the carbon nanotube sheet 10 are bundled) and/or a process for increasing a presence density of the carbon nanotubes in a thickness direction.

The carbon nanotube sheet 10 may be subjected to the densification process, preferably the bundling process, so that the carbon nanotube sheet 10 has the structure where the carbon nanotubes are bundled into fibers.

Examples of the densification process include: a bundling process where the carbon nanotube sheet 10 in the free-standing state is exposed to steam of a room-temperature liquid substance (e.g., water, alcohols such as ethanol, methanol and isopropylalcohol, ketones such as acetone and methyl ethyl ketone, and esters such as ethyl acetate); and a bundling process where the carbon nanotube sheet 10 in the free-standing state is exposed to particles of a room-temperature liquid substance (aerosol).

For the densification process using particles of a room-temperature liquid substance, a diameter of the particles of the room-temperature liquid is preferably in a range from 5 nm to 200 µm, more preferably in a range from 7.5 nm to 100 µm, and further preferably in a range from 10 nm to 50 µm.

The carbon nanotube sheet 10 may be a sheet having the structure where the carbon nanotubes are bundled into fibers, the sheet being a sheet obtained by forming the carbon nanotubes into a plurality of linear bodies each in a form of a string or a ribbon and arranging the plurality of linear bodies to form a sheet. When the carbon nanotube sheet 10 is the sheet obtained by arranging the plurality of linear bodies to form a sheet, the adherability of the adhesive sheet 1A can be enhanced. When the carbon nanotube sheet 10 is the sheet obtained by arranging the plurality of linear bodies to form a sheet, it is preferable to arrange the linear bodies spaced from each other to form a sheet on one surface of the adhesive agent layer or the like in order to further improve adhesiveness and sustain an adhesive force.

It should be noted that the linear body in a form of a string, which is formed from the carbon nanotubes, can be obtained, for instance, as a string spun from a carbon nanotube dispersion liquid and by spinning the carbon nanotube sheet and further twisting the spun carbon nanotube sheet. In addition, the linear body to be formed in a ribbon from the carbon nanotubes can be obtained, for instance, by spinning the carbon nanotube sheet without twisting the carbon nanotube sheet. The linear body formed in a ribbon from the carbon nanotubes has non-twisted structure. In order to enhance uniformity of a thickness of the linear body, the linear body is preferably formed in a string from the carbon nanotubes. Moreover, in order to enhance a purity of the carbon nanotubes in the linear body, the linear body is preferably formed in a string from the carbon nanotubes by spinning the carbon nanotube sheet and further twisting the spun carbon nanotube sheet.

The carbon nanotube sheet 10 may be a laminate including a plurality of laminated sheets manufactured by drawing the carbon nanotubes from the forest. When the carbon nanotube sheet 10 is the laminate, the sheet resistance of the carbon nanotube sheet 10 can be lowered. In this case, the carbon nanotube sheet 10 may be provided by laminating a plurality of the carbon nanotube sheets having been subjected to the densification process or may be provided by laminating a plurality of sheets manufactured by drawing the carbon nanotubes from the forest and subjecting the laminated sheets to the densification process. Alternatively, a plurality of carbon nanotube sheets 10 having been subjected to the densification process may be laminated and further subjected to the densification process.

A thickness of the carbon nanotube sheet 10 is appropriately determined depending on the intended use of the adhesive sheet 1A. For instance, in terms of the adherability of the adhesive sheet stuck on the adherend with the carbon nanotube sheet 10 being interposed between the adherend and the adhesive agent layer, a thickness $t_{10}$ of the carbon nanotube sheet 10 (see FIG. 1) is preferably in a range from 0.01 μm to 100 μm and more preferably in a range from 0.05 μm to 75 μm.

Adhesive Agent Layer

The adhesive agent layer 20 is curable. When cured, the adhesive agent layer 20 exhibits a hardness sufficient for protecting the carbon nanotube sheet 10 and thus functions as a protection film.

The adhesive agent layer 20 is preferably an energy-ray-curable layer that is curable by irradiation with an energy ray such as ultraviolet ray, visible energy ray, infrared ray and electron beam. It should be noted that "energy-ray curing" herein includes thermal curing (i.e., curing by heating with an energy ray).

Conditions for energy-ray curing depend on the type of the used energy ray. For instance, when the adhesive agent layer 20 is cured by irradiation with ultraviolet ray, it is preferable that the irradiation amount of the ultraviolet ray is in a range from 10 mJ/cm$^2$ to 3,000 mJ/cm$^2$ and an irradiation time be in a range from 1 second to 180 seconds.

The adhesive agent of the adhesive agent layer 20 is not particularly limited as long as it provides the adhesive agent layer 20 with curing properties. Examples of the adhesive agent include acrylic adhesive, urethane adhesive, rubber adhesive, polyester adhesive, silicone adhesive and polyvinylether adhesive. Among the above, the adhesive agent of the adhesive agent layer 20 is preferably at least one selected from the group consisting of acrylic adhesive, urethane adhesive and rubber adhesive, and more preferably an acrylic adhesive.

Examples of an acrylic adhesive include a polymer having a repeating unit derived from alkyl(meth)acrylate containing a straight or branched alkyl group and an acrylic polymer having a repeating unit derived from (meth)acrylate with a cyclic structure. It should be noted that "(meth)acrylate" includes "acrylate" and "methacrylate" and the same applies to the other similar terms.

When the acrylic polymer is a copolymer, the type of the copolymer is not particularly limited. The acrylic copolymer may be a block copolymer, a random copolymer or a graft copolymer.

Among the above, an acrylic copolymer having a repeating unit (a1) derived from an alkyl(meth)acrylate containing an alkyl group having 1 to 20 carbon atoms (a1') (hereinafter, also referred to as "monomer component (a1')") and an acrylic copolymer having a repeating unit (a2) derived from a functional-group-containing monomer (a2') (hereinafter, also referred to as "monomer component (a2')") are preferable as the acrylic adhesive used in the first exemplary embodiment.

It should be noted that the acrylic copolymer may further have a repeating unit (a3) derived from another monomer component (a3') different from the monomer component (a1') and the monomer component (a2').

The alkyl group in the monomer component (a1') preferably has 1 to 12 carbon atoms, more preferably has 4 to 8 carbon atoms, and further preferably has 4 to 6 carbon atoms in terms of enhancement of the adherability. Examples of the monomer component (a1') include methyl(meth)acrylate, ethyl(meth)acrylate, propyl(meth)acrylate, n-butyl(meth) acrylate, 2-ethylhexyl(meth)acrylate, lauryl(meth)acrylate, tridecyl(meth)acrylate and stearyl(meth)acrylate. Among the above examples of the monomer component (a1'), butyl (meth)acrylate and 2-ethylhexyl(meth)acrylate are preferable, and butyl(meth)acrylate are more preferable.

The content of the repeating unit (a1) is preferably in a range from 50 mass % to 99.5 mass % of the total repeating units of the acrylic copolymer (100 mass %), more preferably in a range from 55 mass % to 99 mass %, further preferably in a range from 60 mass % to 97 mass %, and still more preferably in a range from 65 mass % to 95 mass %.

Examples of the monomer component (a2') include a hydroxy-group-containing monomer, carboxy-group-containing monomer, epoxy-group-containing monomer, amino-group-containing monomer, cyano-group-containing monomer, keto-group-containing monomer, and alkoxysilyl-group-containing monomer. Among the above examples of the monomer component (a2'), a hydroxy-group-containing monomer and a carboxy-group-containing monomer are preferable.

Examples of the hydroxy-group-containing monomer include 2-hydroxyethyl(meth)acrylate, 2-hydroxylpropyl (meth)acrylate, hydroxybutyl(meth)acrylate, 3-hydroxybutyl(meth)acrylate and 4-hydroxybutyl(meth)acrylate, among which 2-hydroxyethyl(meth)acrylate is preferable.

Examples of the carboxy-group-containing monomer include a (meth)acrylic acid, maleic acid, fumaric acid and itaconic acid, among which a (meth)acrylic acid is preferable.

Examples of the epoxy-group-containing monomer include glycidyl(meth)acrylate. Examples of the amino-group-containing monomer include diaminoethyl(meth) acrylate. Examples of the cyano-group-containing monomer include acrylonitrile.

The content of the repeating unit (a2) is preferably in a range from 0.1 mass % to 50 mass % of the total repeating units of the acrylic copolymer (100 mass %), more preferably in a range from 0.5 mass % to 40 mass %, further preferably in a range from 1.0 mass % to 30 mass %, and still more preferably in a range from 1.5 mass % to 20 mass %.

Examples of the monomer component (a3') include: (meth)acrylates having a cyclic structure such as cyclohexyl (meth)acrylate, benzyl(meth)acrylate, isobornyl(meth)acrylate, dicyclopentanyl(meth)acrylate, dicyclopentenyl(meth)

acrylate, dicyclopentenyloxyethyl(meth)acrylate, imide (meth)acrylate and acryloylmorpholine; vinyl acetate; and styrene.

The content of the repeating unit (a3) is preferably in a range from 0 mass % to 40 mass % of the total repeating units of the acrylic copolymer (100 mass %), more preferably in a range from 0 mass % to 30 mass %, further preferably in a range from 0 mass % to 25 mass %, and still more preferably in a range from 0 mass % to 20 mass %.

It should be noted that one of the above monomer components (a1') may be singularly used or two or more thereof may be used in combination, one of the above monomer components (a2') may be singularly used or two or more thereof may be used in combination, and one of the above monomer components (a3') may be singularly used or two or more thereof may be used in combination.

The acrylic copolymer may be cross-linked. A cross linker may be a known epoxy cross-linker, isocyanate cross-linker, aziridine cross-linker or metal chelate cross-linker. In order to cross-link the acrylic copolymer, the functional group derived from the monomer component (a2') may be used as a cross-linking point where the acrylic copolymer is reacted with the cross-linker.

A composition for forming the adhesive agent layer 20 preferably contains an energy-ray-curable component in addition to the above adhesive agent.

When the energy-ray is an ultraviolet ray, the energy-ray-curable component may be a compound having two or more ultraviolet-polymerizable functional groups in a molecule. Examples of such a compound include trimethylolpropane tri(meth)acrylate, ethoxylated isocyanuric acid tri(meth)acrylate, ditrimethylolpropane tetra(meth)acrylate, tetramethylolmethane tetra(meth)acrylate, pentaerythritol tri(meth)acrylate, dipentaerythritol monohydroxy penta(meth)acrylate, dipentaerythritol hexa(meth)acrylate, caprolactone-modified dipentaerythritol hexa(meth)acrylate, 1,4-butylene glycol di(meth)acrylate, 1,6-hexanediol di(meth)acrylate, dicyclopentadiene dimethoxy di(meth)acrylate, polyethylene glycol di(meth)acrylate, oligoester (meth)acrylate, urethane(meth)acrylate oligomer, epoxy-modified (meth)acrylate, and polyether(meth)acrylate.

For the acrylic adhesive agent, using a compound having in a molecule: a functional group reactive with a functional group derived from the monomer component (a2') in the acrylic copolymer; and an energy-ray-polymerizable functional group, the functional group of the compound may be reacted with the functional group derived from the monomer component (a2') in the acrylic copolymer so that a side chain of the acrylic copolymer becomes polymerizable by irradiation with an energy ray. In addition to the acrylic adhesive agent, a component having an energy-ray-polymerizable side chain may be used as a copolymer component different from the copolymer component as the main component.

When the adhesive agent layer 20 is curable by irradiation with an energy ray, the composition for forming the adhesive agent layer may contain a photopolymerization initiator to increase the speed of curing of the adhesive agent layer 20 by irradiation with an energy ray. Examples of the photopolymerization initiator include benzophenone, acetophenone, benzoin, benzoinmethylether, benzoinethylether, benzoinisopropylether, benzoinisobutylether, benzoin benzoic acid, benzoin methyl benzoate, benzoin dimethylketal, 2,4-diethyl thioxanthone, 1-hydroxy cyclohexylphenylketone, benzyl diphenyl sulfide, tetramethylthiuram monosulfide, azobisisobutyronitrile, benzyl, dibenzyl, diacetyl, 2-chloro anthraquinone, 2,4,6-trimethylbenzoyl diphenylphosphine oxide, 2-benzothiazole-N,N-diethyldithiocarbamate, and oligo{2-hydroxy-2-methyl-1-[4-(1-propenyl)phenyl]propanone}.

One of the energy-ray-curable components may be singularly used or a mixture of two or more thereof may be used.

The composition for forming the adhesive agent layer 20 may further contain an inorganic filler. When the composition contains an inorganic filler, the hardness of the cured adhesive agent layer 20 is further increased. Additionally, the heat conductivity of the adhesive agent layer 20 is increased. Further, when the adherend consists mainly of glass, the linear expansion coefficient of the adhesive sheet approaches that of the adherend, which results in an increased reliability of a device provided by sticking and curing the adhesive sheet on the adherend.

Examples of the inorganic filler include silica powder, alumina powder, talc powder, calcium carbonate powder, titanium white powder, colcothar powder, silicon carbide powder and boron nitride powder, round beads made from any of the above powder, a single crystal fiber, and glass fiber.

Among the above, a silica filler and an alumina filler are preferable. The inorganic fillers may be singularly used or two or more thereof may be used in combination.

The inorganic filler is preferably subjected to surface modification (coupling) using a compound having a curable functional group.

Examples of the curable functional group include a hydroxyl group, a carboxyl group, an amino group, a glycidyl group, an epoxy group, an ether group, an ester group, and a group having an ethylenically unsaturated bond. Examples of a compound having the above curable functional group(s) include a silane coupling agent.

In order to make the rupture resistance of the coating film (the strength of the coating film) sustainable, the inorganic filler is preferably surface-modified by a compound containing an energy-ray-curable functional group such as a group having an ethylenically unsaturated bond.

The inorganic filler surface-modified by the compound having the energy-ray-curable functional group, for instance, strengthens a layer provided by the adhesive sheet stuck and cured on the adherend (e.g., glass). Rupture of the coating film can thus be easily prevented even when the cured layer is provided on a window, a mirror or the like and a suction cup attached on the cured layer is removed.

When the adhesive agent layer 20 contains the surface-modified inorganic filler, the adhesive agent layer 20 preferably further contains another energy-ray-curable component.

For the adhesive sheet 1A according to the first exemplary embodiment, the content of the inorganic filler is preferably in a range from 0 mass % to 95 mass % of the total amount of the composition for forming the adhesive agent layer, more preferably in a range from 5 mass % to 90 mass %, and further preferably in a range from 10 mass % to 80 mass %.

The pencil hardness of the cured adhesive agent layer 20 is preferably HB or greater, more preferably F or greater, and further preferably H or greater. The performance of the cured adhesive agent layer 20 for protecting the carbon nanotube sheet 10 can thus be improved to further sufficiently protect the carbon nanotube sheet 10. Further, even when the adhesive agent layer 20 is remote from the adherend relative to the carbon nanotube sheet 10 and a base 30 (described later) is not provided to a surface of the adhesive agent layer 20 (a second surface 22 (hereinafter, occasionally referred to as "second adhesive surface 22"))

opposite to the surface in contact with the carbon nanotube sheet 10 (the first adhesive surface 21), the cured adhesive agent layer 20 itself is prevented from being damaged after the adhesive sheet is stuck on the adherend.

It should be noted that pencil hardness is a value measured according to JIS K 5600-5-4.

The adhesive agent in the adhesive agent layer 20 may contain additional component(s) as long as the effect(s) of the invention is not impaired. Examples of the additional component(s) include organic solvent, flame retardant, tackifier, ultraviolet absorber, antioxidant, preservative, antifungal agent, plasticizer, antifoaming agent and wettability modifier.

A thickness of the adhesive agent layer 20 is appropriately determined depending on the intended use of the adhesive sheet 1A. For instance, in terms of adherability, a thickness $t_{20}$ (see FIG. 1) of the adhesive agent layer 20 formed on the first sheet surface 11 of the carbon nanotube sheet 10 is preferably in a range from 3 μm to 150 μm, and more preferably in a range from 5 μm to 100 μm.

Manufacturing Method of Adhesive Sheet

A manufacturing method of the adhesive sheet 1A is not particularly limited.

For instance, the adhesive sheet 1A may be manufactured through the following process.

A forest of carbon nanotubes is first formed on a substrate such as a silicon wafer by a known method. Subsequently, an end of the forest is twisted and drawn with tweezers or the like to manufacture the carbon nanotube sheet 10. The manufactured carbon nanotube sheet 10 is subjected to a densification process as needed.

The adhesive agent layer 20 is manufactured independently of the carbon nanotube sheet 10. The adhesive agent is first applied on a release sheet to form a coating film. The coating film is then dried to manufacture the adhesive agent layer 20.

The first sheet surface 11 of the carbon nanotube sheet 10 is stuck on the first adhesive surface 21 of the manufactured adhesive agent layer 20. Subsequently, the release sheet is removed to provide the adhesive sheet 1A.

The adhesive sheet 1A includes the carbon nanotube sheet 10 and the curable adhesive agent layer 20. In sticking the adhesive sheet 1A on the adherend, the carbon nanotube sheet 10 of the adhesive sheet 1A may be stuck on the adherent (i.e., the adhesive sheet 1A may be stuck on the adherend with the carbon nanotube sheet 10 being sandwiched between the first adhesive surface 21 and the adherend) or, alternatively, the second adhesive surface 22 of the adhesive sheet 1A may be stuck on the adherend. When the base (described later) is not present on the second surface (hereinafter, occasionally referred to as "second sheet surface 12") of the carbon nanotube sheet 10 opposite to the surface in contact with the adhesive agent layer 20 (the first sheet surface 11), the carbon nanotube sheet 10 of the adhesive sheet 1A is preferably stuck on the adherend. This is because the carbon nanotube sheet 10 of the adhesive sheet 1A can be sufficiently protected by a combination of the adherend and the cured adhesive agent layer 20 even when the cured adhesive agent layer 20 fails to sufficiently protect the carbon nanotube sheet 10. When the adhesive sheet 1A is stuck on the adherend, the carbon nanotube sheet 10 can be protected by the cured adhesive agent layer 20. The impact resistance of the adhesive sheet 1A is thus improved, so that the adhesive sheet 1A should be suitable for a practical use.

Further, when the adhesive agent layer 20 is cured, the heat conductivity increased and thus the adhesive sheet 1A is suitably usable, for instance, as a defogger. The carbon nanotube sheet 10 is promptly heated within a plane. Therefore, when the adhesive sheet 1A is used as a defogger, condensation or freezing can be promptly eliminated. Further, in the defogger, the cured adhesive agent layer 20 contributes to preventing electric shock.

The adhesive sheet of the first exemplary embodiment enables the carbon nanotube sheet to be easily usable in machines, devices and the like. Further, since the carbon nanotube sheet exhibits excellent heat conductivity and electrical conductivity, the adhesive sheet is suitable for usage such as a defogger, a deicer, and a breakage preventive film of a display.

Second Exemplary Embodiment

Description will be made on an arrangement of an adhesive sheet according to a second exemplary embodiment. In the description of the second exemplary embodiment, the like reference signs, names or the like are attached to the same components as those of the first exemplary embodiment and explanation thereof is omitted or simplified. Further, in the second exemplary embodiment and a specific example(s) thereof, the same compounds and the like as ones described in the first exemplary embodiment may be employed as long as they are not particularly described.

Figure 2:
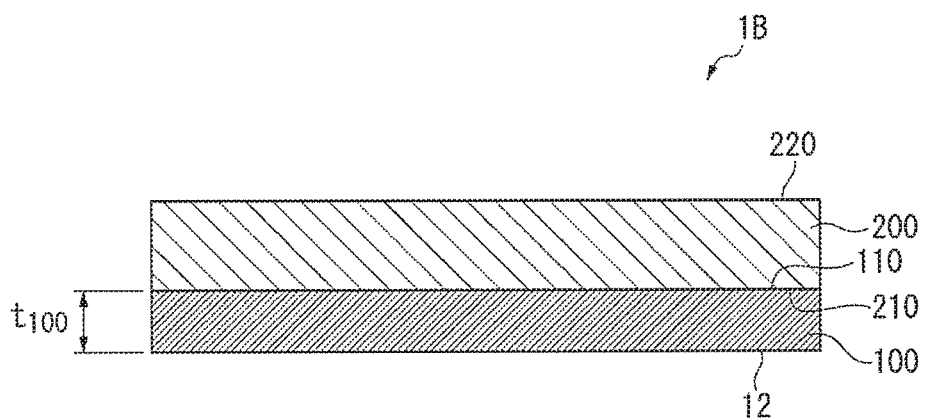
FIG. 2 is a sectional view showing an adhesive sheet according to another exemplary embodiment of the invention.

As shown in FIG. 2, an adhesive sheet 1B according to a second exemplary embodiment includes a carbon nanotube sheet 100 and an adhesive agent layer 200 containing an adhesive agent. In the adhesive sheet 1B according to the second exemplary embodiment, a first sheet surface 110 (hereinafter, occasionally referred to as "first sheet surface 110") of the carbon nanotube sheet 100 is in contact with a first adhesive surface 210 (hereinafter, occasionally referred to as "first adhesive surface 210") of the adhesive agent layer 200.

The adhesive sheet 1B has a light transmissivity of 70% or more. The adhesive sheet 1B may be stuck on an adherend to provide a window (e.g., a vehicle window) or a mirror, the vehicle window being required to allow for the visibility of other vehicles, pedestrians, traffic signals, traffic signs, traffic conditions and the like, the mirror being required to provide an image with sharpness. As long as the light transmissivity of the adhesive sheet is 70% or more, the visibility and the sharpness of the image should be easily achieved as required.

The light transmissivity of the adhesive sheet 1B is preferably in a range from 70% to 100% and more preferably in a range from 80% to 100%.

It should be noted that the light transmissivity may be measured using an optical transmissivity measuring instrument including a visible-ultraviolet light source and a spectrometer.

In the second exemplary embodiment, the carbon nanotube sheet 100 preferably has a structure where the carbon nanotubes are bundled into fibers. When the carbon nanotubes are bundled into fibers, the light transmittance of the carbon nanotube sheet is improved. As a result, the total light transmissivity of the adhesive sheet can be easily maintained within the above range.

In the second exemplary embodiment, an average diameter of the structure where the carbon nanotubes are bundled into fibers is preferably in a range from 1 μm to 300 μm, more preferably in a range from 3 μm to 150 μm, and further preferably in a range from 5 μm to 50 μm.

In the second exemplary embodiment, the carbon nanotube sheet 100 is preferably subjected to a densification process. The densification process of the carbon nanotube sheet also improves the light transmittance of the adhesive sheet and, consequently, the total light transmissivity of the adhesive sheet can be easily maintained within the above range.

In the second exemplary embodiment, it is also preferable that the carbon nanotube sheet 100 is a sheet having the structure where the carbon nanotubes are bundled into fibers, the sheet being obtained by forming the carbon nanotubes into a plurality of linear bodies each in a form of a string or a ribbon and arranging the plurality of linear bodies to form a sheet. When the carbon nanotube sheet 100 is the sheet obtained by arranging the plurality of linear bodies to form a sheet, the adherability of the adhesive sheet 1B can be enhanced. When the carbon nanotube sheet 100 is the sheet obtained by arranging the plurality of linear bodies to form a sheet, it is more preferable to arrange the linear bodies spaced from each other to form a sheet on one surface of the adhesive agent layer or the like in order to control the light transmissivity. In order to enhance uniformity of the thickness of the linear body, the linear body is preferably formed in a string from the carbon nanotubes.

The carbon nanotube sheet 100 may be a laminate including a plurality of laminated sheets manufactured by drawing the carbon nanotubes from the forest. When the carbon nanotube sheet 100 is the laminate, the sheet resistance of the carbon nanotube sheet 100 can be lowered. In this case, the carbon nanotube sheet 100 may be a laminate including a plurality of carbon nanotube sheets that are subjected to a densification process. Alternatively, the carbon nanotube sheet 100 may be a laminate including a plurality of sheets manufactured by drawing the carbon nanotubes from the forest, the sheets being laminated and subsequently subjected to the densification process. Further alternatively, a plurality of carbon nanotube sheets 100 subjected to the densification process may be laminated and further subjected to the densification process. Still further alternatively, the carbon nanotube sheet may be a laminate including a plurality of carbon nanotube sheets, in each of which the carbon nanotubes are bundled into fibers.

In the second exemplary embodiment, in order to more easily increase the light transmissivity of the adhesive sheet 1B, a thickness $t_{100}$ (see FIG. 2) of the carbon nanotube sheet 10 is preferably in a range from 0.01 µm to 100 µm and more preferably in a range from 0.05 µm to 75 µm.

In the second exemplary embodiment, the adhesive agent forming the adhesive agent layer 200 is not particularly limited, but any known adhesive agents are usable as the adhesive agent.

In the second exemplary embodiment, the adhesive agent layer 200 preferably further contains an inorganic filler, which is preferably surface-modified by a compound having an energy-ray-curable functional group. In the second exemplary embodiment, an average particle diameter of the inorganic filler is preferably 1 µm or less and more preferably 0.5 µm or less. When the average particle diameter of the inorganic filler is in the above range, the light transmissivity of the adhesive sheet 1B can be easily increased and the haze of the adhesive sheet 1B can be reduced. The lower limit of the average particle diameter of the inorganic filler is not particularly limited but preferably 5 nm or more.

In the second exemplary embodiment, the adhesive agent layer 200 may be curable. When the adhesive agent layer is cured, the impact resistance is improved to prevent deformation of the adhesive agent layer due to an impact.

The adhesive sheet of the second exemplary embodiment enables the carbon nanotube sheet to be easily usable in machines, devices and the like. Further, since the carbon nanotube sheet exhibits excellent heat conductivity and electrical conductivity, the adhesive sheet is suitable for usage such as a defogger, a deicer, and a breakage preventive film of a display.

Modifications of Embodiment(s)

The scope of the invention is not limited to the first and second exemplary embodiments but includes modifications and improvements compatible with the invention. It should be noted that the like reference signs are attached to the same members and the like as those of the exemplary embodiment(s) and explanation thereof is omitted or simplified hereinbelow.

For instance, the adhesive sheet may include a base in the exemplary embodiment(s).

In this case, the surface (the second surface (hereinafter, occasionally referred to as "second adhesive surface") of the adhesive agent layer opposite to the surface in contact with the carbon nanotube sheet may be in contact with a first surface of the base.

Alternatively, the second sheet surface (hereinafter, referred to as "second sheet surface") of the carbon nanotube sheet may be in contact with the first surface of the base. In this case, the base can be stuck on the carbon nanotube sheet due to the influence of the adherability provided to the second sheet surface by the adhesive agent layer.

Figure 3:
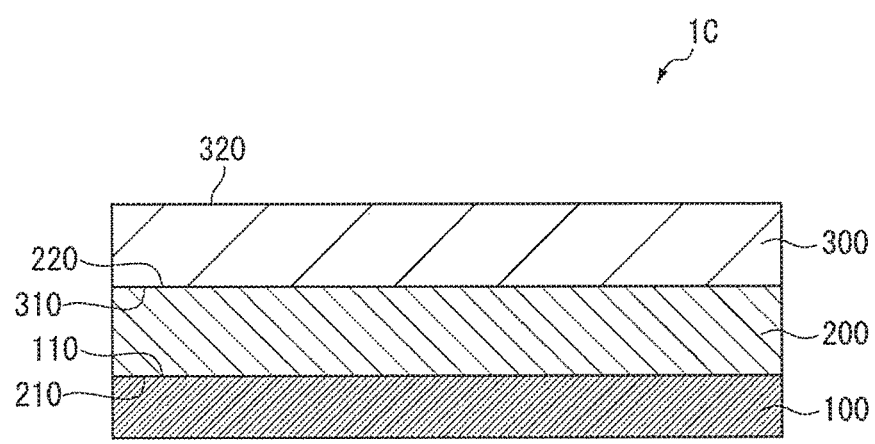
FIG. 3 is a sectional view showing an adhesive sheet according to still another exemplary embodiment of the invention.

For instance, in an adhesive sheet 1C shown in FIG. 3, a base 300 is laminated on the second adhesive surface 220 of the adhesive sheet 1B of the second exemplary embodiment (i.e., the second adhesive surface 220 of the adhesive sheet 1B is in contact with the first surface 310 of the base 300).

The base 300 may be paper, a resin film, a cured product of a curable resin, a metal foil or a glass film. Examples of the resin film include a polyester resin film, polycarbonate resin film, polyimide resin film, polyolefin resin film, polyurethane resin film and acryl resin film.

A second surface 320 of the base 300 may be hard-coated with an ultraviolet curable resin or the like to be further protected.

In the above exemplary embodiments, the adhesive sheet may further include a release layer laminated on the second adhesive surface of the adhesive agent layer. The adhesive sheet may further include a release layer laminated on the second sheet surface of the carbon nanotube sheet.

Figure 4:
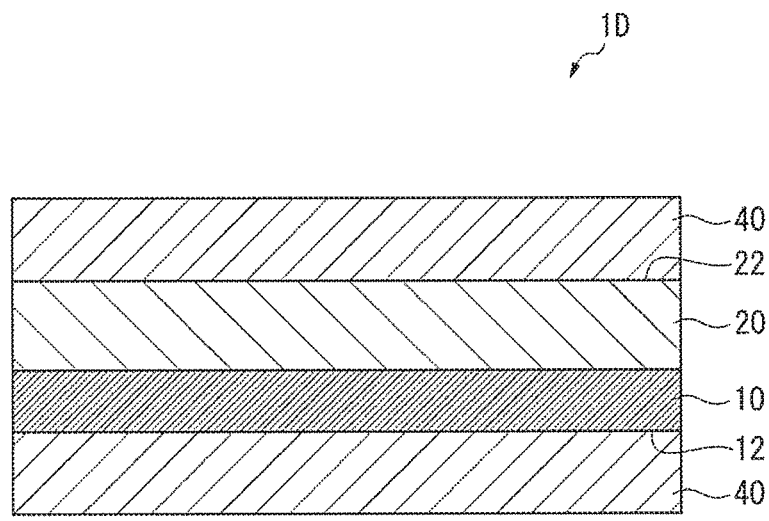
FIG. 4 is a sectional view showing an adhesive sheet according to a further exemplary embodiment of the invention.

For instance, in an adhesive sheet 1D shown in FIG. 4, a release layer 40 is laminated on each of the second sheet surface 12 of the carbon nanotube sheet 10 and the second adhesive surface 22 of the adhesive agent layer 20 of the adhesive sheet 1A of the first exemplary embodiment.

The release layer 40 is not particularly limited. For instance, in terms of easy handling, the release layer 40 preferably includes a release base and a release agent layer provided by applying a release agent on the release base. The release layer 40 may include a release agent applied on one surface of the release base or may include a release agent applied on both surfaces of the release base. The release base may be a paper base, a laminate paper including the paper base and a thermoplastic resin such as polyethylene laminated on the paper base, or a plastic film. Examples of the paper base include glassine paper, coated paper and cast coated paper. Examples of the plastic film include polyester films such as polyethylene terephthalate, polybutylene terephthalate and polyethylene naphthalate, and polyolefin films such as polypropylene and polyethylene. Examples of the release agent include an olefin rein, rubber elastomer (e.g., butadiene resin and isoprene resin), long-chain alkyl resin, alkyd resin, fluorine resin and silicone resin.

A thickness of the release layer 40 is not particularly limited. The thickness of the release layer 40 is usually in a range from 20 μm to 200 μm and is preferably in a range from 25 μm to 150 μm.

A thickness of the release agent layer is not particularly limited. When the release agent layer is provided by applying a solution containing the release agent, the thickness of time release agent layer is preferably in a range from 0.01 μm to 2.0 μm and more preferably in a range from 0.03 μm to 1.0 μm.

When the plastic film is used as the release base, a thickness of the plastic film is preferably in a range from 3 μm to 50 μm and more preferably in a range from 5 μm to 40 μm.

For instance, in the exemplary embodiment(s), the adhesive sheet may also include another adhesive agent layer provided on the second sheet surface of the carbon nanotube sheet.

Figure 5:
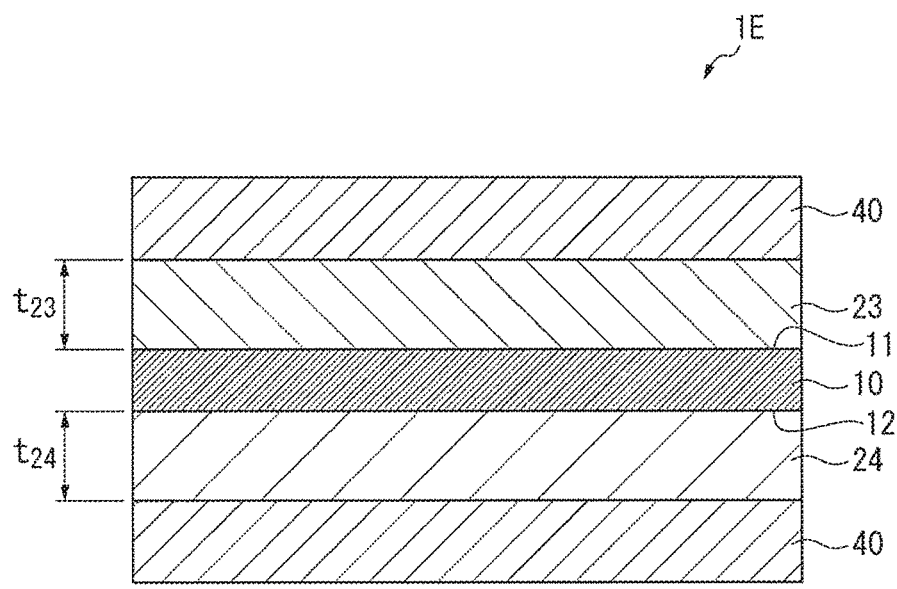
FIG. 5 is a sectional view showing an adhesive sheet according to a still further exemplary embodiment of the invention.

For instance, in an adhesive sheet 1E shown in FIG. 5, first adhesive agent layer 23 and second adhesive agent layer 24 are respectively provided on the first sheet surface 11 and the second sheet surface 12 of the carbon nanotube sheet 10 of the adhesive sheet 1A of the first exemplary embodiment. At least one of the first adhesive agent layer 23 and the second adhesive agent layer 24 is required to contain the same adhesive agent as the adhesive agent in the adhesive agent layer 20 described in the first exemplary embodiment. The adhesive agent in the first adhesive agent layer 23 and the adhesive agent in the second adhesive agent layer 24 may be the same, similar or totally different. A base may be provided to a surface of at least one of the adhesive agent layer 23 and the adhesive agent layer 24 opposite to the surface in contact with the carbon nanotube sheet 10.

In the adhesive sheet 1E, a thickness $t_{23}$ of the first adhesive agent layer 23 on the first sheet surface 11 and a thickness $t_{24}$ of the second adhesive agent layer 24 on the second sheet surface 12 (see FIG. 5) are each independently preferably in a range from 3 μm to 150 μm and more preferably in a range from 5 μm to 100 μm. In the adhesive sheet 1E, the sum of the thickness $t_{23}$ of the first adhesive agent layer 23 and the thickness $t_{24}$ of the second adhesive agent layer 24 (the total thickness of the adhesive agent layer) is preferably in a range from 10 μm to 300 μm and more preferably in a range from 20 μm to 200 μm.

The adhesive sheet 1E may also include the release layer 40 covering each of the first adhesive agent layer 23 and the second adhesive agent layer 24.

EXAMPLE(S)

The invention will be described in further detail with reference to Example(s). The invention is, however, by no means limited by Example(s).

Example 1

Manufacturing of Carbon. Nanotube Sheet
Preparation of Carbon Nanotube Forest

Using thermal chemical vapor deposition (CVD) equipment including three furnaces and using argon gas as a carrier gas and acetylene as a carbon source, a carbon nanotube forest was formed on a divided six-inch silicon wafer by catalytic chemical vapor deposition. A height of the carbon nanotube forest was 300 μm.

Formation of Carbon Nanotube Sheet

An end of the carbon nanotube forest was twisted and drawn with tweezers into a carbon nanotube sheet. The carbon nanotube sheet was held on two parallel support sticks (copper sticks with a 2-mm diameter) with the assistance of the self-adhesiveness of the sheet, and an unnecessary part was cut off. A free-standing (self-supported) carbon nanotube sheet held between the two support sticks was thus obtained. Further, using a jig having two parallel support sticks, a distance between which is narrower than that of the above support sticks, the free-standing carbon nanotube sheet, which was held between the above support sticks, was remounted between the support sticks of the jig to obtain a free-standing carbon nanotube sheet (unmodified sheet)).

Aerosol Exposure of Carbon Nanotube Sheet

Ethanol aerosol (carrier medium: air) was generated using a supersonic humidifier, and then the free-standing unmodified carbon nanotube sheet on each jig was exposed in the generated aerosol for one minute.

Subsequently, the free-standing carbon nanotube sheet was left for one minute at room temperature to obtain a carbon nanotube sheet with carbon nanotubes being bundled (modified sheet). The modified sheet was then remounted on a release layer, i.e., a release sheet (manufactured by LINTEC Corporation, SP-PET381031). An average of diameters of randomly selected five bundles of the carbon nanotubes (structures bundled in the form of fibers) was 10 μm Manufacturing of Adhesive Agent Layer A coating liquid containing the following components i) to iii) was prepared:
i) a filler: a methacryloyl-group-modified reactive silica (average diameter: 25 nm) in an amount of 60 parts by mass;
ii) a polymerizable compound: dipentaerythritol polyacrylate in an amount of 40 parts by mass; and
iii) a photopolymerization initiator (manufactured by BASF, "Irgacure (registered trademark) 184") in an amount of 3 parts by mass.

The above coating liquid was applied on one surface of the release layer, i.e., the release sheet (manufactured by LINTEC Corporation, product name: SP-PET381031), using a knife coater to make a 30 μm adhesive agent layer. It should be noted that an average particle size of the reactive silica was determined by selecting ten of the particles of the reactive silica at random under an electron microscope and averaging the maximum lengths thereof.

Manufacturing of Adhesive Sheet

An exposed surface of the modified carbon nanotube sheet (a surface opposite to the surface in contact with the release sheet as the release layer) was stuck on an exposed surface of the adhesive agent layer (a surface opposite to the surface in contact with the release sheet as the release layer) to provide an adhesive sheet with the release layer.

Example 2

An adhesive sheet of Example 2 was manufactured in the same manner as the adhesive sheet of Example 1 except that a coating liquid prepared by dissolving a mixture of the following components (parts by mass: solid ratio) in an organic solvent was used to make an adhesive agent layer.
(A) a copolymer (average molecular weight: 900,000, glass transition temperature: minus 28 degrees C.) prepared by copolymerizing butyl acrylate of 55 parts by weight, methyl methacrylate of 10 parts by weight, glycidyl methacrylate of 20 parts by weight, and 2-hydroxyethyl acrylate of 15 parts by weight: 20 parts by mass (B) epoxy resin
(B-1) a liquid bisphenol A-type epoxy resin (epoxy equivalent: 180 to 200, softening point: no, molecular weight: approximately 420): 20 parts by mass
(B-2) a solid bisphenol A-type epoxy resin (epoxy equivalent: 800 to 900, softening point: 93 degrees C., molecular weight: approximately 1700): 40 parts by mass
(B-3) an epoxy resin having a dicyclopentadiene skeleton (manufactured by Nippon Kayaku Co., Ltd, product name: XD-1000-L, epoxy equivalent: 240 to 250, softing point: 66 degrees C.): 20 parts by mass
(C) a thermoactive latent hardener for epoxy resin (epoxy hardener)
(C-1) dicyandiamide (manufactured by Asahi Denka K. K., product name: Hardener 3636AS): 1 part by mass
(C-2) 2-phenyl-4,5-hydroxymethylimidazole (SHIKOKU CHEMICALS CORPORATION, product name: CUREZOL 2PHZ): 1 part by mass
(D) an energy-ray-copolymerizable compound
(D-1) an energy-ray-copolymerizable compound having a dicyclopentadiene skeleton (manufactured by Nippon Kayaku Co., Ltd, product name: KAYARAD R-684) (molecular weight: 304): 10 parts by mass
(E) a photopolyrmerization initiator: 1-hydroxycyclohe phenyl ketone: 0.3 parts by mass
(F) other cross-linker: aromatic polyisocyanate (trimethylol propane adduct of toluylene diisocyanate: 0.3 parts by mass Comparative 1

A coating liquid was prepared by adding 100 parts by mass of a solution of an acrylic copolymer (average molecular weight: 700,000, glass transition temperature: minus 60 degrees C., concentration: 40 mass %), which was prepared by copolymerizing 2-ethylhexyl acrylate (77 parts by mass), methyl methacrylate (20 parts by mass) and 2-hydroxyethyl acrylate (3.0 parts by mass), with 1.5 parts by mass of a xylylene diisocyanate cross-linker solution (manufactured by Toyo Ink Manufacturing Co. Ltd., product name: BHS8515, concentration: 37.5 mass %), 1.4 parts by mass of a rosin derivative having a carboxyl group (manufactured by Arakawa Chemical Industries, Ltd., Pine Crystal KE-604, softing point: 130 degrees C. (a value measured by a ring and ball method)), and 30 parts by mass of methyl ethyl ketone (MEK), and mixing together. An adhesive sheet of Comparative Example 1 was manufactured in the same manner as the adhesive sheet of Example 1 except that the above coating liquid was used, a 25-µm-thick polyethylene terephthalate film was used as a base in place of the release sheet, a release layer is provided on a carbon nanotube sheet, and the base is provided on an adhesive agent layer.
Evaluation of Impact Resistance of Adhesive Sheet
Prior to evaluation, the adhesive sheet of Example 1 was subjected to a polymerization process where the adhesive sheet was irradiated with an ultraviolet ray at an irradiation amount of 500 mJ/cm² using a high-pressure mercury lamp. The adhesive agent layer including the above adhesive sheet was thus cured by the polymerization process. The adhesive sheet of Example 2 was irradiated with an ultraviolet ray at an irradiation amount of 230 mJ/cm² using a high-pressure mercury lamp, and then left in a constant temperature bath at 160 degrees C. for an hour so that the adhesive agent layer is heated to be cured.
The release layer on the carbon nanotube sheet was removed from each of the adhesive sheets obtained in Examples 1 and 2 and Comparative Example 1, and the carbon nanotube sheet surface was stuck on a glass plate. Subsequently, the release layer on the adhesive agent layer was also removed from each of adhesive sheets obtained in Examples 1 and 2.
The adhesive sheet and the glass plate were horizontally placed with the adhesive agent layer facing upward. A load was applied on the adhesive agent layer (or on the base of the adhesive sheet of Comparative Example 1) using a steel ball weighing 174 g, and left at 25 degrees C. for an hour. A thickness of a portion of the adhesive sheet was measured before and after the load is applied. The adhesive sheet was evaluated as A when the thickness was not changed, and evaluated as B when the thickness was changed. Table 1 shows the results.

TABLE 1

|  | Evaluation of Impact Resistance |
| --- | --- |
| Example 1 | A |
| Example 2 | A |
| Comparative 1 | B |

As shown in Table 1, the adhesive sheets of Examples 1 and 2 are excellent in impact resistance.

Example 3

Manufacturing of Carbon Nanotube Sheet
A modified carbon nanotube sheet was manufactured in the same manner as the carbon nanotube sheet of Example 1.
Manufacturing of Adhesive Agent Layer
A coating liquid containing the following components i) to iii) was prepared:
i) a filler: a reactive silica (manufactured by NISSAN CHEMICAL INDUSTRIES, LTD.) in an amount of 60 parts by mass;
ii) a polymerizable compound: dipentaerythritol polyacrylate in an amount of 40 parts by mass; and
iii) a photopolymerization initiator (manufactured by BASF, "Irgacure (registered trademark) 184") in an amount of 3 parts by mass.
The above coating liquid was applied on one surface of a base (a polyethylene terephthalate film (thickness: 25 µm)) at an amount sufficient for making a 30-µm adhesive agent layer using a knife coater.
Manufacturing of Adhesive Sheet
An exposed surface of the above modified carbon nanotube sheet was stuck on an exposed surface of the adhesive agent layer including the base to provide an adhesive sheet with a release layer.

Example 4

Manufacturing of Adhesive Sheet
Preparation of Carbon Nanotube Forest
Using thermal chemical vapor deposition (CVD) equipment including three furnaces and using argon gas as a carrier gas and acetylene as a carbon source, a carbon nanotube forest was formed on a 50-mm wide silicon wafer by catalytic chemical vapor deposition. A height of the carbon nanotube forest was 300 µm.
Formation of Ribbon from Carbon Nanotubes
As shown in FIG. 6, a ribbon 5 was formed from carbon nanotubes by a continuous operation including steps of: (a) drawing a carbon nanotube sheet from a forest 2; (b) bundling the drawn carbon nanotube sheet; (c) spinning the bundled carbon nanotube sheet into a ribbon; and (d) winding the ribbon 5. It should be noted that, in FIG. 6 and later-described FIGS. 7A to 7D, each of components and the like are reduced in size as needed in order to show the components and the like in size enough to be recognizable in the drawings.

The steps (a) to (d) were conducted as follows.

(a) Step of Drawing Carbon Nanotube Sheet from Forest 2

An end of the carbon nanotube forest 2 was twisted and drawn with tweezers into a 7-mm wide carbon nanotube sheet.

(b) Step of Bundling Drawn Carbon Nanotube Sheet

The drawn carbon nanotube sheet was passed through a metal ring 3 with a 5-mm diameter to be bundled.

(c) Step of Spinning Bundled Carbon Nanotube Sheet into Ribbon

The bundled carbon nanotube sheet was delivered through the metal ring 3 to a rubber roller 4 with a 3-cm diameter, the rubber roller 4 vibrating in an axial direction. The bundled sheet was brought into contact with the rubber roller 4 vibrating in the axial direction to be slid on the rubber roller 4. Friction generating in this sliding movement caused the bundled carbon nanotube sheet to be formed into a ribbon.

(d) Step of Winding Ribbon 5

The spun ribbon 5 was wound around a bobbin 6. The ribbon 5 was thus formed from the carbon nanotubes.

Manufacturing of Adhesive Sheet

Next, a re-releasable sheet 7 having an adhesive agent layer (manufactured by MeCan imaging Inc., Product name: MTAR) was wound with an adhesive surface facing outward around the above-described rubber roller in a creaseless manner.

The ribbon 5 of the carbon nanotubes was attached to an end of the above-described adhesive surface (the adhesive surface positioned near an end of the rubber roller 4) (FIG. 7A), and then the ribbon 5 was wound around the rubber roller 4 while being fed (FIG. 7B). During this operation, the rubber roller 4 was displaced at a constant speed in a direction in parallel with an axis of the rubber roller 4, and the ribbon 5 was wound in an equidistant spiral around the rubber roller 4. The re-releasable sheet 7 was cut together with the ribbon 5 of the carbon nanotubes in parallel with the axis of the rubber roller 4 (FIG. 7C), so that an adhesive sheet 1F having a carbon nanotube sheet in which a plurality of ribbons 5 of carbon nanotubes were arranged on the sheet (adhesive agent layer) 7 (i.e., a carbon nanotube sheet having carbon nanotubes bundled into fibers) was obtained (FIG. 7D). In the obtained adhesive sheet 1F, a diameter of the ribbon 5 forming the carbon nanotube sheet was 20 μm (an average value at five randomly chosen positions) and an interval between the arranged ribbons 5 was 1.7 mm.

Comparative 2

An adhesive sheet of Comparative Example 2 was manufactured in the same manner as the adhesive sheet of Example 3 except the specific process for manufacturing the carbon nanotube sheet. Specifically, the free-standing carbon nanotube sheet held between the support sticks was not remounted between support sticks of the jig, but a release layer, i.e., a release sheet (manufactured by LINTEC Corporation, product name: SP-PET381031), was alternatively remounted on a flat surface. The densification process was not performed in Comparative 2.

Measurement of Light Transmissivity of Adhesive Sheet

The release layer was removed from each of the adhesive sheets manufactured in Examples 3 and 4 and Comparative 2, and the carbon nanotube sheet surface was stuck on a glass plate.

The light transmissivity of each of the adhesive sheets was measured as an optical transmissivity using a visible-ultraviolet light source (product name: L10290, manufactured by Hamamatsu Photonics K. K.) and a spectrometer (product name: USB2000, manufactured by Ocean Optics, Inc.). Light was applied from a side of the adhesive sheet provided with the carbon nanotube sheet. An intensity $I_0$ ($\lambda$) of the light with a wavelength $\lambda$ emitted from the light source and an intensity $I$ ($\lambda$) of the light passing through the adhesive sheet were measured using the spectrometer, and a transmissivity $T(\lambda)$ of the light with the wavelength $\lambda$ was calculated from a light intensity ratio ($I/I_0$). For the measurement, an optical axis was adjusted so that the light from the light source was vertically incident on the adhesive sheet. An average of transmissivity in a visible light range (380 nm to 760 nm) was obtained to calculate the light transmissivity. It should be noted that the light transmissivity of the adhesive sheet was obtained by subtracting the transmissivity of the glass plate, which was independently measured, from the transmissivity $T$ ($\lambda$). Table 2 shows the results.

TABLE 2

| | Light Transmissivity (%) |
|---|---|
| Example 3 | 85 |
| Example 4 | 93 |
| Comparative 2 | 65 |

As shown in Table 2, the adhesive sheets of Examples 3 and 4 have a favorable light transmissivity of 80% or more.

INDUSTRIAL APPLICABILITY

The invention is applicable to an adhesive sheet. The adhesive sheet according to the invention enables the carbon nanotube sheet to be easily usable in machines, devices and the like. Further, since the carbon nanotube sheet exhibits excellent heat conductivity and electrical conductivity, the adhesive sheet is suitable for usage such as a defogger, a deicer, and a breakage preventive film of a display.

The invention claimed is:

1. An adhesive sheet comprising:
    a carbon nanotube sheet comprising a plurality of carbon nanotubes aligned in one direction within a plane of the sheet, and
    an adhesive agent layer comprising an adhesive agent, wherein a light transmissivity of the adhesive sheet is 70% or more,
    wherein the carbon nanotubes of the carbon nanotube sheet are bundled into fibers with an average diameter in a range from 1 μm to less than 50 μm,
    wherein the adhesive agent layer is laminated on the carbon nanotube sheet,
    wherein a longitudinal axis of each of the plurality of carbon nanotubes is aligned in parallel with the adhesive agent layer, and
    wherein the adhesive agent layer further comprises an inorganic filler.

2. The adhesive sheet according to claim 1, wherein the carbon nanotube sheet has been exposed to steam or aerosol of a liquid substance.

3. The adhesive sheet according to claim 1, wherein the carbon nanotube sheet is a sheet obtained by forming the carbon nanotubes into a plurality of linear bodies each in a form of a string or a ribbon and arranging the plurality of linear bodies to form a sheet.

4. The adhesive sheet according to claim 1, wherein the inorganic filler has been surface-modified by a compound comprising an energy-ray-curable functional group.

5. The adhesive sheet according to claim 1, wherein the carbon nanotube sheet is obtained by drawing carbon nanotubes from a carbon nanotube forest.

6. The adhesive sheet according to claim 1, wherein the plurality of carbon nanotubes are obtained by thermal chemical vapor deposition.

7. The adhesive sheet according to claim 5, wherein a height of the carbon nanotube forest is 300 μm.

8. The adhesive sheet according to claim 1, wherein
the carbon nanotube sheet has a first surface and a second surface opposite to the first surface,
the adhesive agent layer has a first surface and a second surface opposite to the first surface, and
the first surface of the carbon nanotube sheet is in contact with the first surface of the adhesive agent layer.

9. The adhesive sheet according to claim 8, wherein the longitudinal axis of each of the plurality of carbon nanotubes is aligned in parallel with the first surface of the adhesive agent layer.

10. An adhesive sheet comprising:
a carbon nanotube sheet comprising a plurality of carbon nanotubes aligned in one direction within a plane of the sheet, and
an adhesive agent layer comprising an adhesive agent, wherein a light transmissivity of the adhesive sheet is 70% or more,
wherein the carbon nanotubes of the carbon nanotube sheet are bundled into fibers with an average diameter in a range from 1 μm to less than 50 μm,
wherein the adhesive agent layer is laminated on the carbon nanotube sheet,
wherein a thickness of the adhesive agent layer is 3 m to 150 μm, and
wherein the adhesive agent layer further comprises an inorganic filler.

11. An adhesive sheet comprising:
a carbon nanotube sheet comprising a plurality of carbon nanotubes aligned in one direction within a plane of the sheet; and
an adhesive agent layer comprising an adhesive agent, wherein a light transmissivity of the adhesive sheet is 70% or more,
wherein the carbon nanotubes of the carbon nanotube sheet are bundled into fibers with an average diameter in a range from 1 μm to less than 50 μm,
wherein the adhesive agent layer is laminated on the carbon nanotube sheet,
wherein a thickness of the adhesive agent layer is 5 μm to 100 μm, and
wherein the adhesive agent layer further comprises an inorganic filler.

* * * * *

UNITED STATES PATENT AND TRADEMARK OFFICE
CERTIFICATE OF CORRECTION

| | | |
|---|---|---|
| PATENT NO. | : 10,981,356 B2 | Page 1 of 1 |
| APPLICATION NO. | : 15/552676 | |
| DATED | : April 20, 2021 | |
| INVENTOR(S) | : Raquel Ovalle et al. | |

It is certified that error appears in the above-identified patent and that said Letters Patent is hereby corrected as shown below:

On the Title Page

Item [73], should read:
LINTEC Corporation
LINTEC OF AMERICA, INC.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*